Nov. 13, 1934.   H. B. ROUSE   1,980,502
MITERING MACHINE
Filed Feb. 19, 1932   3 Sheets-Sheet 1
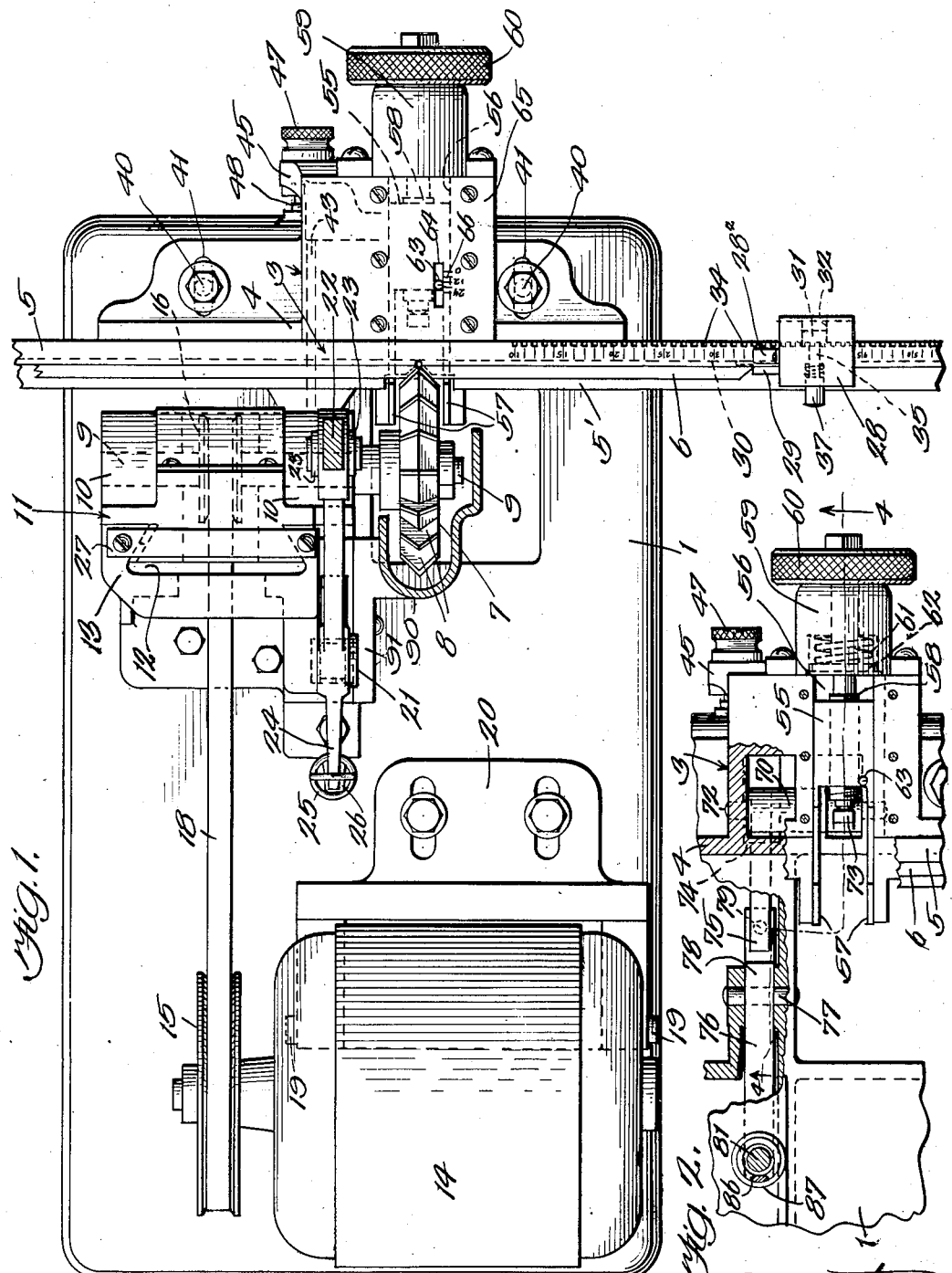
Inventor:
Harry B. Rouse
By John H. Nelson Atty.

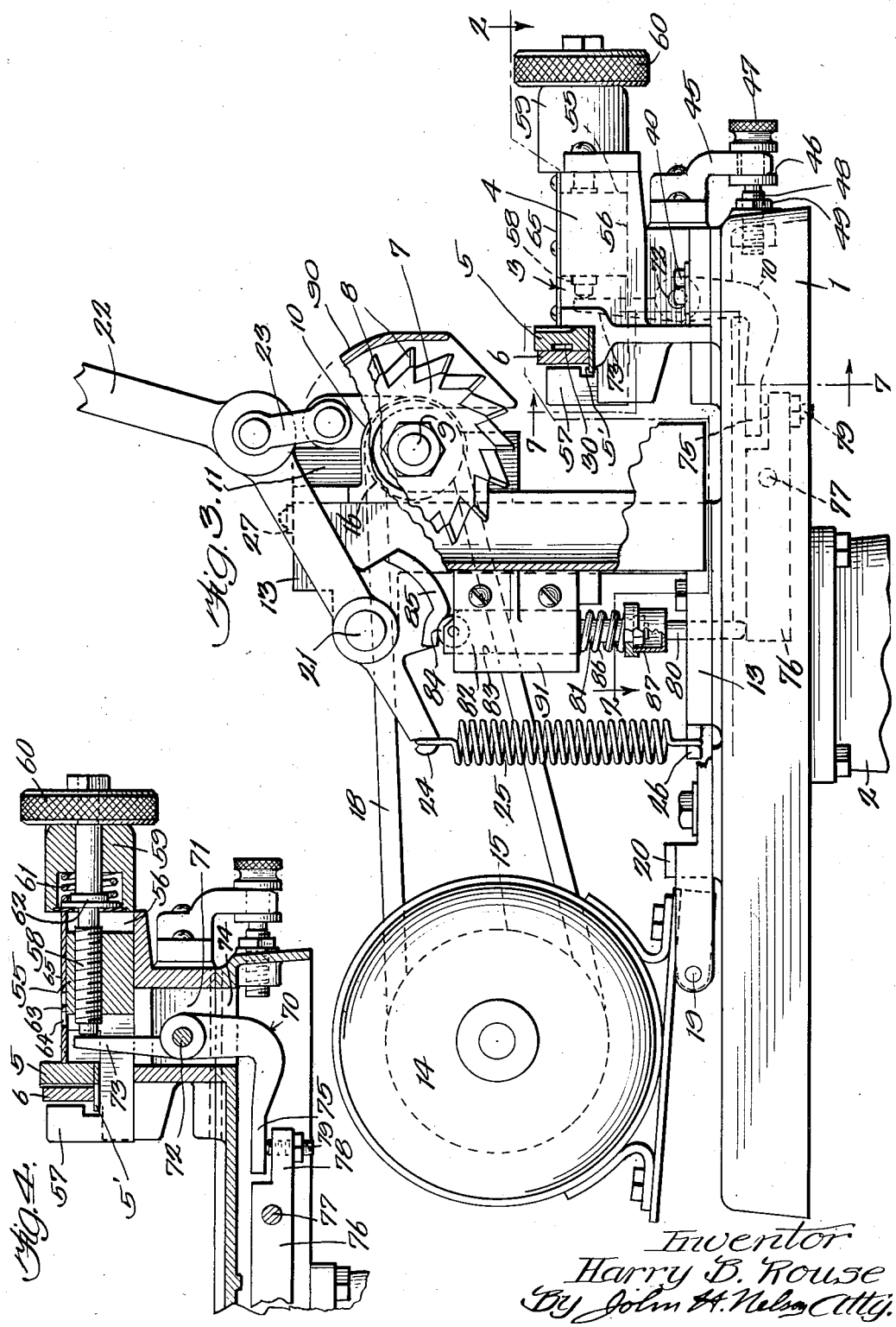

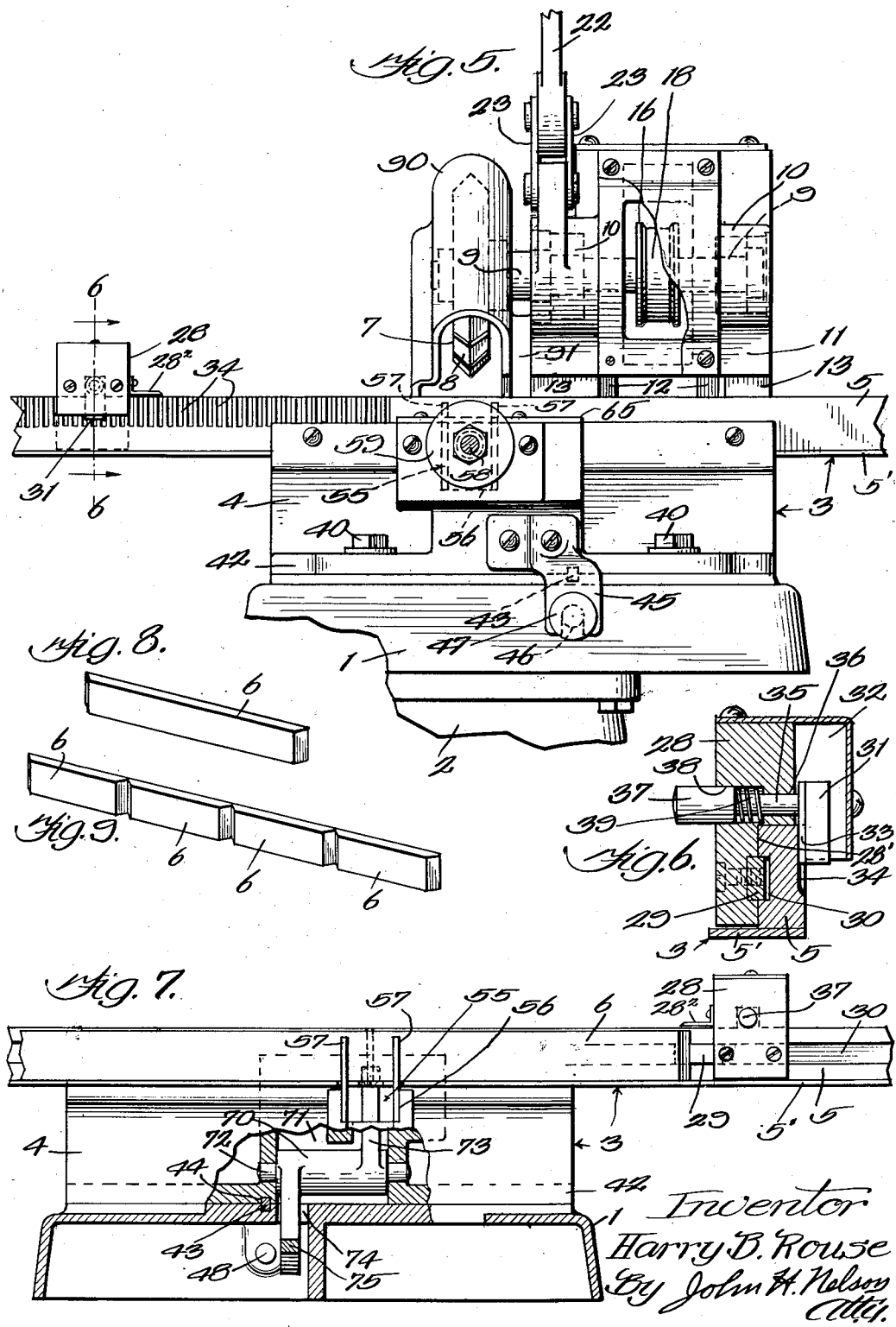

Patented Nov. 13, 1934

1,980,502

UNITED STATES PATENT OFFICE 1,980,502

MITERING MACHINE

Harry B. Rouse, Chicago, Ill., assignor to H. B. Rouse & Company, Chicago, Ill., a corporation of Illinois Application February 19, 1932, Serial No. 594,005

4 Claims. (Cl. 90—15)

This invention relates to mitering machines, and particularly pertains to such a machine for cutting metal strips into beveled ended lengths, and is especially adapted for cutting beveled printers' rules.

Among the objects of the invention are to provide such a machine as stated, wherein the beveling and cutting operation is expedited; with which a plurality of rules may be produced comprising sections which are connected at their beveled ends by a very thin web of metal, thus enabling the rules to be easily separated after they are taken from the machine; wherein the strip or rule is prevented from shifting while being cut or the cut sections prevented from spreading apart during the cutting operation, thereby also precluding the possibility of a distorted cut.

In its preferred embodiment, the machine includes a reciprocably mounted beveling cutterhead, and an adjustably mounted work support for positioning a strip in the path of the cutter. A movable clamp element is employed on the support for clamping the strip, on each side of the cutter, and being adjustable in its clamping relation to the strip. An operating arm is employed, which is connected to the head and clamp for simultaneously operating same.

It is another object of the invention to provide means whereby the clamp element is substantially maintained in a constant predetermined clamping relation to the strip at various adjustments of the support, thereby eliminating the necessity of readjusting the clamp whenever the support is adjusted.

Other objects and advantages will become apparent by reference to the specification and accompanying drawings, in which:

Fig. 1 is a plan view of the machine, with parts broken away and parts in section.

Fig. 2 is a sectional plan view of a portion of the machine taken on the line 2—2 of Fig. 3, with parts omitted, parts in section and parts broken away.

Fig. 3 is a side view of the machine, with parts in section and parts broken away.

Fig. 4 is a sectional view of a portion of the machine taken substantially on the line 4—4 of Fig. 2.

Fig. 5 is a front view of the machine, with parts broken away.

Fig. 6 is a section taken on the line 6—6 of Fig. 5.

Fig. 7 is a cross section of the machine taken on the line 7—7 of Fig. 3, with parts indicated in full.

Figs. 8 and 9 are perspective views of two forms of product possible with the machine, comprising, respectively, a single beveled ended printer's rule and a plurality of connected beveled rules.

The machine includes a frame which comprises an elongated table 1 suitably supported upon a pedestal 2. Adjustably mounted at one end of the table is a work-support head 3, comprising a bracket 4 having mounted thereon a horizontally disposed bar 5 which extends crosswise of the table. The bar has a shelf portion 5' for supporting the printer's rule or strip 6 to be cut, which is placed against the side of the bar in an edgewise upright position. The strip is positioned in the path of a vertically reciprocable cutter 7 for mitering and cutting the strip into lengths. The cutter 7 is in the form of a power-driven wheel with peripheral cutting teeth 8 having beveled cutting faces. The cutter wheel is mounted upon one end of a shaft 9 rotatably mounted in the bearings 10 at each side of a hollow head 11. The cutter head 11 is reciprocably mounted in the vertical dovetail guideway 12 of the bracket 13 mounted on the table.

An electric motor 14 is provided for driving the cutter wheel, having a pulley 15 in driving connection with the pulley 16 on the shaft 9, through the intermediation of the belt 18. The motor is hingedly mounted at 19 to a bracket 20 mounted on the table. The hinge connection is offset from the center of gravity of the motor, so that the weight of the motor will maintain the belt 18 taut as the cutter head is reciprocated.

Pivotally mounted at 21 on the bracket 13 is an operating arm or lever 22 connected by means of links 23 to the cutter head 11 for manually reciprocating same. The arm 22 has an extension 24 opposite its pivot, at the end of which is connected one end of a tension spring 25 anchored to the base of the bracket 13 at 26. The spring maintains the cutter head normally in its raised position against a stop plate 27 on top of the bracket 13.

For determining the length of the strips to be cut and beveled, gauging means is provided comprising a block 28 slidably mounted on the bar 5, the bar being received within the slot 28' of the block. The block has a key 29 received within the longitudinal groove 30 in the side of the bar 5 for guiding the block, and against the end of which the strips are placed in determining their length. The gauge block is locked on the bar 5 in adjusted positions by means of a plunger 31 slidable in the slot 32 in the block, and has teeth 33 engaging with the rack teeth 34 along the edge of the bar 5. The plunger is secured to one end of an operating pin 35 slidable in the horizontal bore 36 of the block. The pin has an enlarged end 37 extending from the block for engagement to release the plunger, and is received within the enlarged portion 38 of the bore. A coiled spring 39 surrounds the pin and is interposed between the head 37 and the shoulder of the bore for resiliently maintaining the plunger in engagement with the rack. Along the top of the bar 5 are graduations for register with the indicator finger 28[2] on the side of the gauge block in determining lengths of strip.

The strip support bracket 4 is mounted adjustably with respect to the cutter wheel for positioning the strip in the path of the cutter teeth to effect various depths of cuts. The bracket is secured to the table by the bolts 40 which pass through the elongated slots 41 in the base portion 42 of the bracket, and which extend longitudinally of the table. On the top of the table is a key 43 received within the keyway 44 in the base of the bracket for guiding same when being adjusted. Depending from the bracket and over the edge of the table is a lug extension 45 having a forked end received within the annular groove 46 of the head 47 of an adjusting screw 48. The screw is threaded in the edge of the table and a lock nut 49 is provided on the screw for holding the bracket 4 in adjusted positions preparatory to tightening the bolts 40.

Providing the adjustable work support makes possible cutting printers' rules either separately or connected by a very thin web of metal therebetween so as to facilitate the handling of short pieces.

Clamping means are employed for clamping the strip or rule on the support at each side of the plane of the cutter wheel, and functioning in such a manner as to prevent shifting of severed or partly severed lengths during the cutting operation. Said means includes a clamp element in the form of a block 55 slidably mounted in the horizontal guideway 56 in the bracket 4. The block 55 is disposed and slidable in the plane of the cutter wheel and has two spaced-apart hooked jaw formations 57 extending under the support bar 5 and projecting upward into cooperative clamping relation with the bar for clamping the strip on each side of the plane of the cutter wheel and close thereto, so that during the cutting operation, the ends of the beveled sections are firmly held together and on the support. This makes possible providing a beveled cut between rule sections, leaving an extremely thin web of metal, which is strong enough to hold the sections together while on the machine, but will not interfere at the miter joints of the rules when they are assembled into a rectangular formation for printing borders about printed matter.

For positioning the jaws in predetermined spaced clamping relations to the strip, an adjusting screw shaft 58 is provided, and is in threaded engagement with the block 55. The screw shaft is adjustably mounted in the bearing 59 on the bracket 4, and has a hand wheel or knob 60 for operating it. A compression spring 61 surrounds the screw shaft and is interposed between the end of the bearing and a collar 62 on the shaft for resiliently maintaining the jaws disengaged.

Indexing means is employed for determining the proper clamping relation of the jaws to various thicknesses of strips or rules of standard sizes. The means includes a pin 63 on the top face of the block 55, which projects through a slot 64 in the cover plate 65 of the bracket. Along the side of the slot are graduations 66 spaced in conformity with standard sizes of rules for register with the pin.

The clamp element is operably connected to the cutter head, so that when the head is moved downward into cooperative relation with the support for cutting the strip, the jaws are applied. The connection is effected by a lever 70 disposed within the hollow 71 of the bracket 4 and centrally pivoted to the bracket at 72. The lever has an end 73 extending upward, engaging the end of the adjusting screw 58.

The lever 70 extends downward from its pivot through a slot 74 in the table and bent at right angles into a horizontal portion 75 which is parallel to the adjustable movement of the bracket 4. Disposed under the table is a horizontal lever 76 centrally pivoted to the table at 77. The end 78 of the lever 76 is in contact with the under side of the end 75 of the lever 70 through the intermediation of the adjusting screw 79. The other end of the lever 76 is engaged by a vertically disposed plunger pin 80 passing through the table. Said pin is in telescopic connection with the stem 81 of a plunger 82 slidably mounted in the vertical guideway 83 in the bracket 13.

The plunger 82 has a roller 84 at its top which engages a cam 85 on the lever 22. A coiled compression spring 86 surrounds the stem of the plunger and is interposed between the end of the plunger and the cupped end 87 of the plunger pin, whereby a resilient connection is effected between the plunger and the lever 76. Thus when the cutter head is lowered by the operating arm for the cutting operation, the clamp is resiliently applied by way of the cam, the plunger and the levers 70 and 76.

Because of the sliding connection between the levers 70 and 76, when the support head is adjusted, the clamp is substantially maintained in constant clamping relation to the strip.

The manner of operating the machine is as follows. After the gauge 28 is set for length of rule, and the jaws are adjusted for proper clearance with respect to the support bar 5, the operator places the strip to be cut against the bar with one hand, holding it down on the shelf portion 5' with one end thereof engaging the stop 29 of the gauge block 28. With his other hand the operator operates the arm 22 which causes the clamping of the strip on the support bar and the operation of the cutter wheel in cutting the strip to length. Thus an operator is enabled to devote the use of one hand to the handling or adjusting of the work or strip on the machine, while his other hand can be controlling the cutting and clamping operation of machine by the manipulation of a single control means. This novel control feature of the machine promotes precision and expediency in cutting printers' rules to beveled ended lengths both singularly and in connected sections, as is illustrated in Figs. 8 and 9. In producing the connected sections, the operator would only have the gauge to adjust in addition to adjusting the strip therewith after the cutting of each section. This is easily done with the same hand without materially hindering the operation of the machine.

Having thus described my invention, I claim:

1. In combination, a reciprocably mounted head having a cutter, a support for positioning a strip in the path of the cutter and arranged whereby the strip is cut cross-wise thereof, said support mounted adjustable toward and from the path of the cutter for regulating the depth of cut to be made in the strip in producing connected or severed strip sections, a clamp element movably mounted on the support and arranged for clamping the strip thereon, a lever pivotally mounted on the support for operating the clamp element and having a free end portion normally extending substantially parallel to the direction of adjustable movement of the support, a movably mounted operating element having slidable contactual connection with said lever end portion and arranged for operating the lever, and means providing a resilient operable connection between the head and the operating element whereby when the head is moved toward the support the clamp element is resiliently applied substantially under a given pressure at various adjustments of the support.

2. In combination, a reciprocably mounted head having a cutter, a support for positioning a strip in the path of the cutter and arranged whereby the strip is cut crosswise thereof, said support mounted adjustable toward and away from the path of the cutter for regulating the depth of cut in the strip in producing connected or severed strip sections, a clamp device including a block mounted slidable on the support in a direction paralleling the direction of adjustable movement of the support and having a jaw formation for clamping the strip on the support, an adjusting screw resiliently mounted on the support and extending in threaded connection through the block for adjusting the jaw with respect to the strip, a lever centrally pivoted on the support with one end in operable connection with the screw for moving the block in applying the jaw and having its other end formed into a portion extending substantially in a direction paralleling the direction of adjustable movement of the support, a movably mounted operating element having slidable contactual connection with said lever end portion for operating the lever, and means providing a resilient operable connection between the head and the operating element whereby when the head is moved toward the support the clamp jaw is resiliently applied substantially under a given pressure at various adjustments of the block or the support.

3. In combination, a frame, a head reciprocably mounted on the frame and having a cutter, a support for positioning a strip in the path of the cutter and arranged whereby the strip is cut crosswise, said support mounted on the frame for adjustment toward and away from the path of the cutter, means for adjusting the support, a clamp device comprising a jaw movably mounted on the support for clamping a strip thereon, a lever element mounted on the support in cooperative operable connection with the jaw for operating same, means providing and maintaining a substantially constant operable connection between the head and lever element for operating the jaw uniformly upon reciprocation of the head at various adjustments of the support including an operating lever element movably mounted on the frame and being operatively connected with the head, said jaw operating lever element and operating lever element having portions correlatively formed to provide a slidable operable connection therebetween whereby the jaw operating lever element remains stationary upon adjustment of the support, and wherein means are provided to effect a resilient operable connection between the operating lever element and the head and embodying a cam operably connected to the head and a spring completing an operable connection between the cam and the element.

4. In combination, a frame, a head reciprocably mounted on the frame and having a cutter, a support for positioning a strip in the path of the cutter and arranged whereby the strip is cut crosswise, said support mounted on the frame for adjustment toward and away from the path of the cutter, means for adjusting the support, a clamp device mounted on the support for clamping the strip thereon, a lever pivotally mounted on the support being operably connected with the device for operating same and having a free end portion normally extending in the direction of adjustable movement of the support for operation, an operating lever centrally pivoted on the frame and having one arm portion in slidable contactual operable connection with said lever free end portion and having its other end portion in operable connection with the head in operating the clamp device upon reciprocation of the head whereby uniformity of operation of the said device is maintained at various adjustments of the support, and means for providing a resilient operable connection between the operating lever arm portion and the head whereby the clamp device is resiliently applied upon initial reciprocation of the head and including a cam operably connected with the head and a spring completing an operable connection between the cam and the operating lever arm portion.

HARRY B. ROUSE.